(12) United States Patent
Li et al.

(10) Patent No.: US 12,475,113 B2
(45) Date of Patent: Nov. 18, 2025

(54) GENERATION OF QUERY TEMPLATES FOR KNOWLEDGE-GRAPH BASED QUESTION ANSWERING SYSTEM

(71) Applicant: International Business Machines Corporation, Armonk, NY (US)

(72) Inventors: Jing Li, Beijing (CN); Jian Wang, Beijing (CN); Jian Min Jiang, Beijing (CN); Zi Ming Huang, Beijing (CN); Zhen Zhang, Beijing (CN); Wanqing Liu, Hefei (CN)

(73) Assignee: International Business Machines Corporation, Armonk, NY (US)

( * ) Notice: Subject to any disclaimer, the term of this patent is extended or adjusted under 35 U.S.C. 154(b) by 1020 days.

(21) Appl. No.: 17/457,445

(22) Filed: Dec. 3, 2021

(65) Prior Publication Data
US 2023/0177363 A1    Jun. 8, 2023

(51) Int. Cl.
*G06F 16/00* (2019.01)
*G06F 16/242* (2019.01)
(Continued)

(52) U.S. Cl.
CPC ...... *G06F 16/24522* (2019.01); *G06F 16/243* (2019.01); *G06F 40/295* (2020.01); *G06N 5/02* (2013.01)

(58) Field of Classification Search
CPC .......................... G06F 16/24522; G06F 16/243
See application file for complete search history.

(56) References Cited

U.S. PATENT DOCUMENTS 5,519,608 A     5/1996  Kupiec
9,183,511 B2 *  11/2015 Li .............................. G06N 5/02
(Continued)

FOREIGN PATENT DOCUMENTS

| CN | 107633060 A | 1/2018 |
| CN | 108038234 A | 5/2018 |
| DE | 112017003946 T5 | 5/2019 |

OTHER PUBLICATIONS

Biermann et al., "A Guided Template-Based Question Answering System over Knowledge Graphs", CEUR Workshop Proceedings (CEUR-WS.org), Proceedings of the EKAW 2018 Posters and Demonstrations Session (EKAW-PD 2018), Nancy, France, Nov. 12-16, 2018. Published Dec. 3, 2018, 4 pages.

(Continued)

*Primary Examiner* — Noosha Arjomandi
(74) *Attorney, Agent, or Firm* — Randy Tejeda

(57) ABSTRACT

A processor obtains a pair including a question and an answer in natural language; determines at least one entity in the question and an entity type of each of the at least one entity consistent with the schema of a knowledge graph (KG); identifies a subset of candidate query templates based on the entity type of each of the at least one entity, wherein the candidate query templates are generated based on the schema of the KG; composes a set of queries by populating the at least one entity into each of the subset of candidate query templates; executes the set of queries on the KG to generate respective answers; identifies a first answer from the respective answers that is matching with the answer in the pair; and determines a candidate query template, from the subset of candidate query templates, corresponding to the first answer as a query template.

20 Claims, 9 Drawing Sheets

(51) Int. Cl.
*G06F 16/2452* (2019.01)
*G06F 40/295* (2020.01)
*G06N 5/02* (2023.01)

(56) References Cited

U.S. PATENT DOCUMENTS

| | | | |
|---|---|---|---|
| 11,086,911 B2 | 8/2021 | Jagan | |
| 11,487,795 B2* | 11/2022 | Sun | G06F 16/332 |
| 11,922,942 B1* | 3/2024 | Kilinc | G10L 15/26 |
| 2017/0032689 A1 | 2/2017 | Beason | |
| 2017/0109355 A1* | 4/2017 | Li | G06N 7/01 |
| 2017/0199928 A1 | 7/2017 | Zhao | |
| 2019/0034410 A1 | 1/2019 | Hudson | |
| 2019/0057145 A1* | 2/2019 | Huang | G06N 5/02 |
| 2019/0065576 A1 | 2/2019 | Peng | |
| 2019/0311003 A1* | 10/2019 | Tonkin | G06N 5/022 |
| 2019/0392066 A1* | 12/2019 | Kim | G06F 16/24578 |
| 2020/0110835 A1 | 4/2020 | Zhao | |
| 2021/0201174 A1* | 7/2021 | Huang | G06N 5/041 |
| 2021/0216577 A1* | 7/2021 | Xiao | G06F 16/3329 |
| 2021/0382923 A1* | 12/2021 | Gragnani | G06F 16/3329 |
| 2022/0075948 A1* | 3/2022 | Yuan | G06N 20/00 |
| 2023/0177363 A1* | 6/2023 | Li | G06F 16/243 706/45 |

OTHER PUBLICATIONS

Huang et al., "Generating Question Templates in a Knowledge-Graph Based Question and Answer System", U.S. Appl. No. 16/730,083, filed Dec. 30, 2019, 27 pages.

IBM, "List of IBM Patents or Patent Applications Treated As Related", Filed Herewith, 2 pages.

Monk, Eric, "Visual Cypher: Presenting Tools That Create, Visualize and Parse Cypher", Solutions Engineer, Neo4j. Aug. 28, 2019, 13 pages.

Wu, "Computer-implemented method for dialoguing with user and computer system", Feb. 13, 2018 (Year: 2018).

Abujabal et al., "Automated Template Generation for Question Answering over Knowledge Graphs", International World Wide Web Conference Committee (IW3C2), Www 2017, Perth, Australia, Apr. 3-7, 2017, 10 Pages.

Indurthi et al., "Generating Natural Language Question-Answer Pairs from a Knowledge Graph Using a RNN Based Question Generation Model", Proceedings of the 15th Conference of the European Chapter of the Association for Computational Linguistics: vol. 1, Long Papers, Valencia, Spain, Apr. 3-7, 2017, 10 Pages.

Seyler et al., "Knowledge Questions from Knowledge Graphs", arXiv:1610.09935v2 [cs.CL], Nov. 1, 2016, 9 Pages.

Sneiders, Eriks, "Automated Question Answering Using Question Templates That Cover the Conceptual Model of the Database", International Conference on Applications of Natural Language to Information Systems, Feb. 28, 2003, 5 Pages.

Zhao et al., "Automatically Generating Questions from Queries for Community-based Question Answering", Proceedings of the 5th International Joint Conference on Natural Language Processing, Chiang Mai, Thailand, Nov. 8-13, 2011, 9 Pages.

Mell et al., "The NIST Definition of Cloud Computing", Recommendations of the National Institute of Standards and Technology, NIST Special Publication 800-145, Sep. 2011, 7 pages.

IBM Appendix P, "List of patent and patent applications treated as related", Filed Herewith, 2 pages.

* cited by examiner

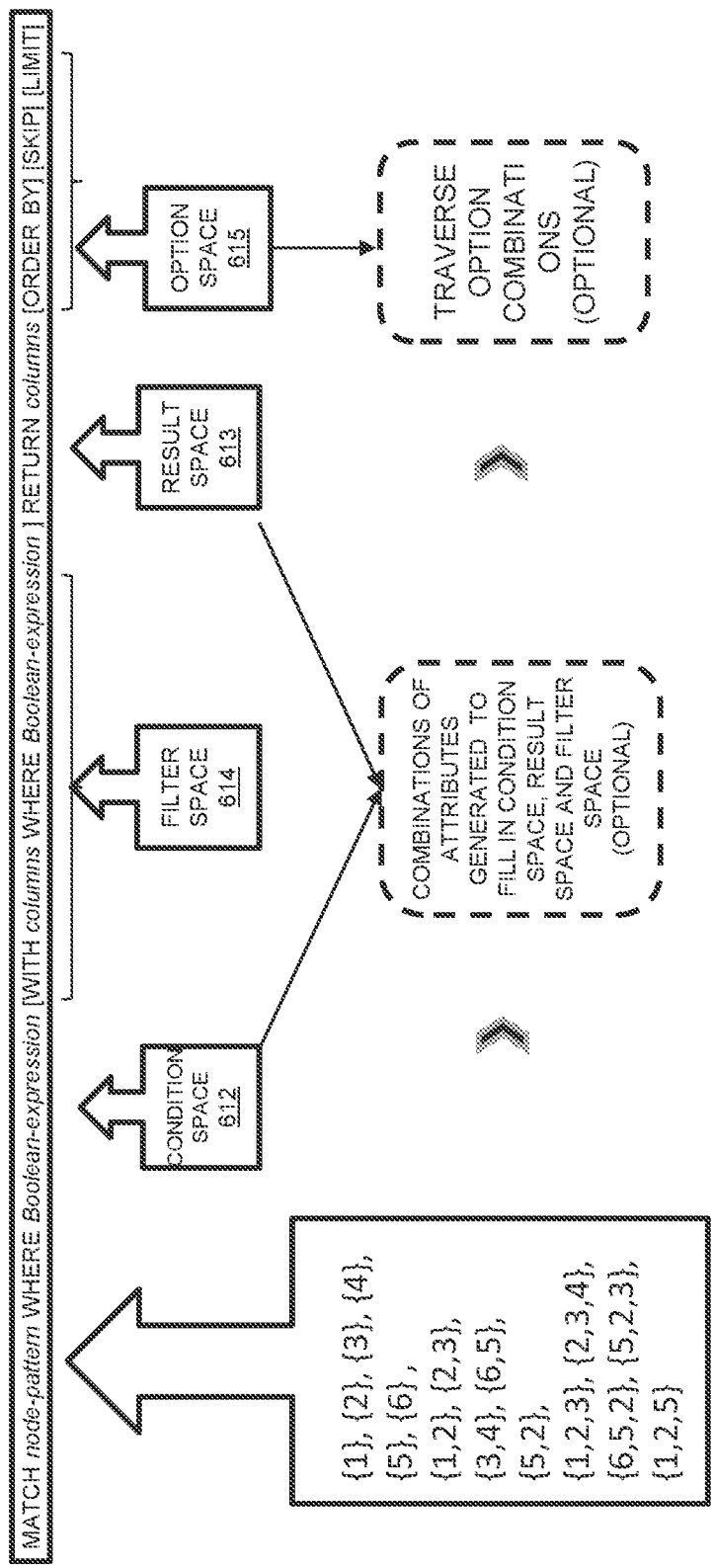
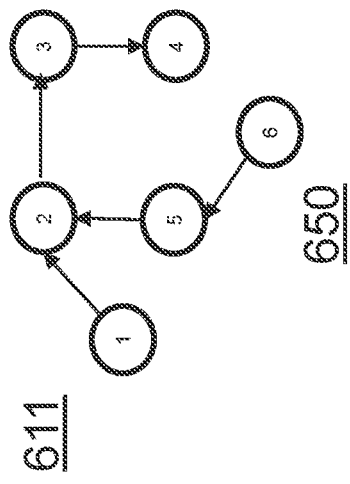
FIG. 6

```
{
    "nodes" : [
        {
            "node_id": "2",
            "node_label": "disease",
            "attribute" : [
                {attribute_name": "name",
                "value_type":"string",
                ...
                },{...other attributes...}
            ]
        },
        {
            "node_id": "5",
            "node_label": "medicine",
            "attribute" : [
                {attribute_name": "name",
                "value_type":"string",
                ...
                },{...other attributes...}
            ]
        }, (...other nodes...)
    ],
    "relations":[
        {
            "from_node_id": "5",
            "to_node_id": "2",
            "directed":true,
            "label": cure,
            "forward_phrase":["{from} cure {to}"],
            "backword_phrase" :["{to} is cured by {from}"]
        },{...other relations...}
    ]
}
```

FIG. 7A

```
{
    "nodes" : [
        {
            "node_id": "5",
            "node_label": "medicine",
            "attribute" : [
                {attribute_name": "name",
                "value_type":"string",
                ...
                },{...other attributes...}
            ]
        },
        {
            "node_id": "6",
            "node_label": "producer",
            "attribute" : [
                {attribute_name": "name",
                "value_type":"string",
                ...
                },{...other attributes...}
            ]
        }, (...other nodes...)
    ],
    "relations":[
        {
            "from_node_id": "6",
            "to_node_id": "5",
            "directed":true,
            "label": manufacture,
            "forward_phrase":["{from} manufactures {to}"],
            "backward_phrase" :["{to} is manufactured by {from}"]
        },{...other relations...}
    ]
}
```

FIG. 7B

GENERATION OF QUERY TEMPLATES FOR KNOWLEDGE-GRAPH BASED QUESTION ANSWERING SYSTEM

BACKGROUND

The present invention relates to knowledge-graph based question answering (KGQA) systems, and more specifically, to a method and system to generate query templates for accelerating the building of a KGQA system.

Advances in natural language processing (NLP) and artificial intelligence (AI) lead to building systems with which people may converse with a machine in natural language to get answers to their questions. Question answering (QA) system is such a system designed to generate answers to questions posed by a human in natural language. For example, chatbots may be founded on a QA system and act as conversational agents that communicate with users based on natural language. Knowledge graph (KG) based question answering (KGQA) system is a kind of QA system that uses knowledge graphs to represent underlying data. Knowledge graphs are data structures that define large networks of entities and their semantic relationships. Since KG data can come from expert annotations or formatting of a database, KGQA systems may provide improved data accuracy and answer performance.

KGQA systems are commonly built by machine learning techniques. Query templates, also referred to as query command templates, are important components of a KGQA. Query templates are used to compose executable queries or query commands by populating parameters into the templates. The queries may be executed to retrieve data from KG for preparing answers to questions in natural language. Generation of query templates is a part of the process of building a KGQA system, which can be laborious and time-consuming.

SUMMARY

According to one aspect of embodiments of the invention, a method comprises obtaining a pair including a question and an answer in natural language, the pair originating from an online resource. The method further comprises determining, by one or more processing units, at least one entity in the question and an entity type of each of the at least one entity in consistence with the schema of a knowledge graph. The method further comprises identifying a subset of candidate query templates based on the entity type of each of the at least one entity, wherein the candidate query templates are generated based on the schema of the knowledge graph. The method further comprises composing a set of queries by populating the at least one entity into each of the subset of candidate query templates. The method further comprises executing the set of queries on the knowledge graph to generate respective answers. The method further comprises identifying a first answer from the respective answers that is matching with the answer in the pair. And the method further comprises determining a candidate query template, from the subset of candidate query templates, corresponding to the first answer as a query template.

According to another aspect of embodiments of the invention, a system includes a processor and a memory containing a program that, when executed on the processor, performs an operation. The operation comprises: obtaining a pair including a question and an answer in natural language, the pair originating from an online resource; determining, by one or more processing units, at least one entity in the question and an entity type of each of the at least one entity in consistence with the schema of a knowledge graph; identifying a subset of candidate query templates based on the entity type of each of the at least one entity, wherein the candidate query templates are generated based on the schema of the knowledge graph; composing a set of queries by populating the at least one entity into each of the subset of candidate query templates; executing the set of queries on the knowledge graph to generate respective answers; identifying a first answer from the respective answers that is matching with the answer in the pair; and determining a candidate query template, from the subset of candidate query templates, corresponding to the first answer as a query template.

According to another aspect of embodiments of the invention, a computer program product includes a computer-readable storage medium having computer-readable program code embodied therewith. The computer-readable program code is executable by one or more computer processors to perform an operation. The operation comprises: obtaining a pair including a question and an answer in natural language, the pair originating from an online resource; determining, by one or more processing units, at least one entity in the question and an entity type of each of the at least one entity in consistence with the schema of a knowledge graph; identifying a subset of candidate query templates based on the entity type of each of the at least one entity, wherein the candidate query templates are generated based on the schema of the knowledge graph; composing a set of queries by populating the at least one entity into each of the subset of candidate query templates; executing the set of queries on the knowledge graph to generate respective answers; identifying a first answer from the respective answers that is matching with the answer in the pair; and determining a candidate query template, from the subset of candidate query templates, corresponding to the first answer as a query template.

BRIEF DESCRIPTION OF THE SEVERAL VIEWS OF THE DRAWINGS

Through the more detailed description of some embodiments of the present invention in the accompanying drawings, the above and other objects, features, and advantages of the present invention will become more apparent, wherein the same reference generally refers to the same components in the embodiments of the present invention.

FIG. 6 illustrates automatic generation of candidate query templates by traversing KG schema space according to an embodiment of the invention.

FIG. 7A illustrates a definition of example elements of schema according to an embodiment of the invention.

FIG. 7B illustrates a definition of further example elements of schema according to an embodiment of the invention.

DETAILED DESCRIPTION

Figure 1:
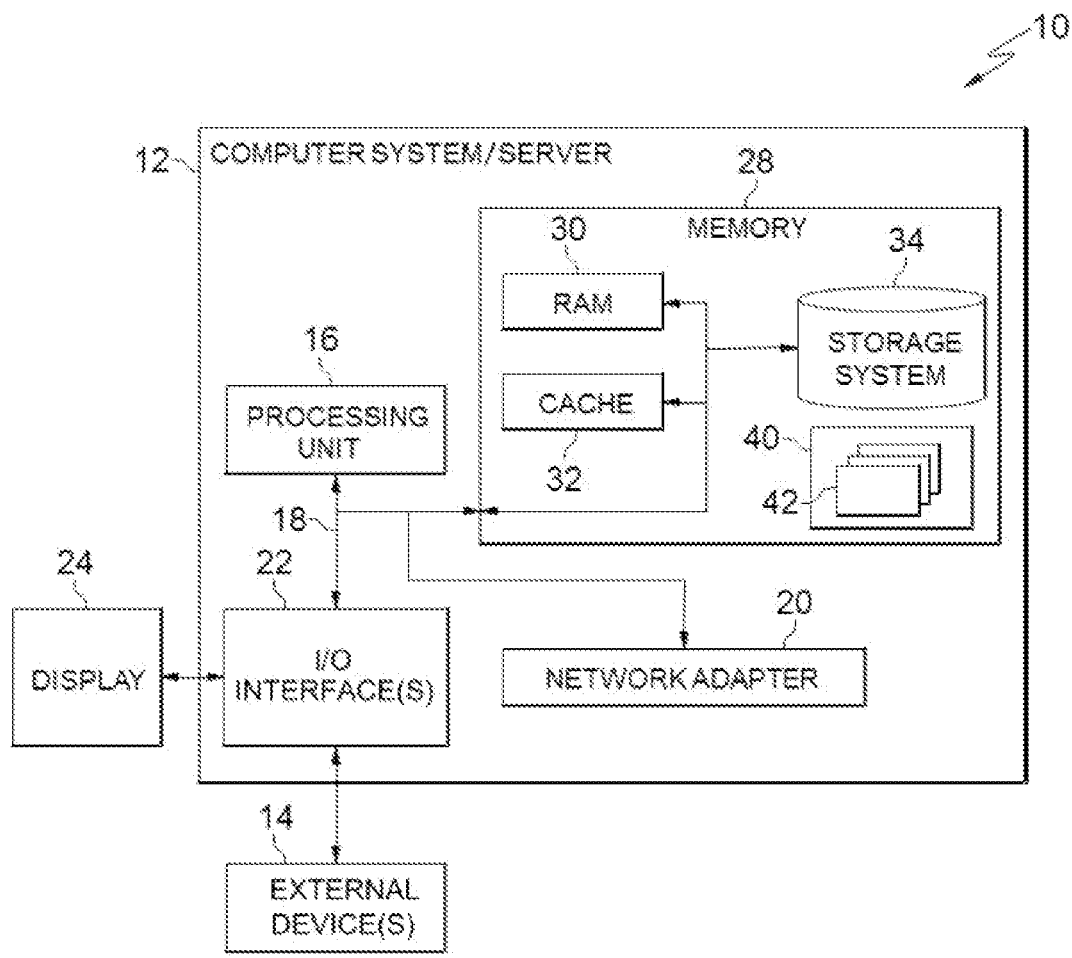
FIG. 1 depicts a cloud computing node according to an embodiment of the present invention.

Some embodiments will be described in more detail with reference to the accompanying drawings, in which the embodiments of the present invention have been illustrated. However, the present invention can be implemented in various manners, and thus should not be construed to be limited to the embodiments disclosed herein.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
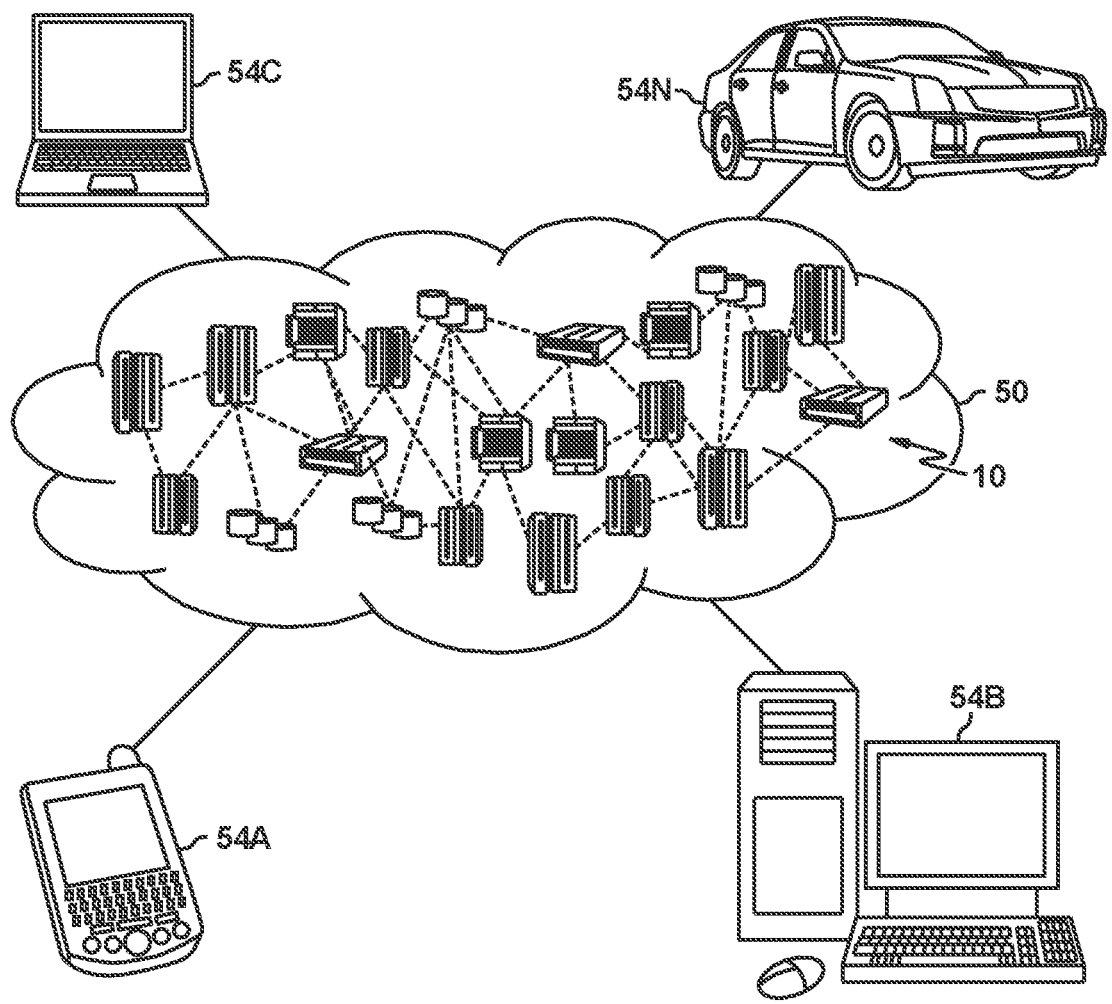
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
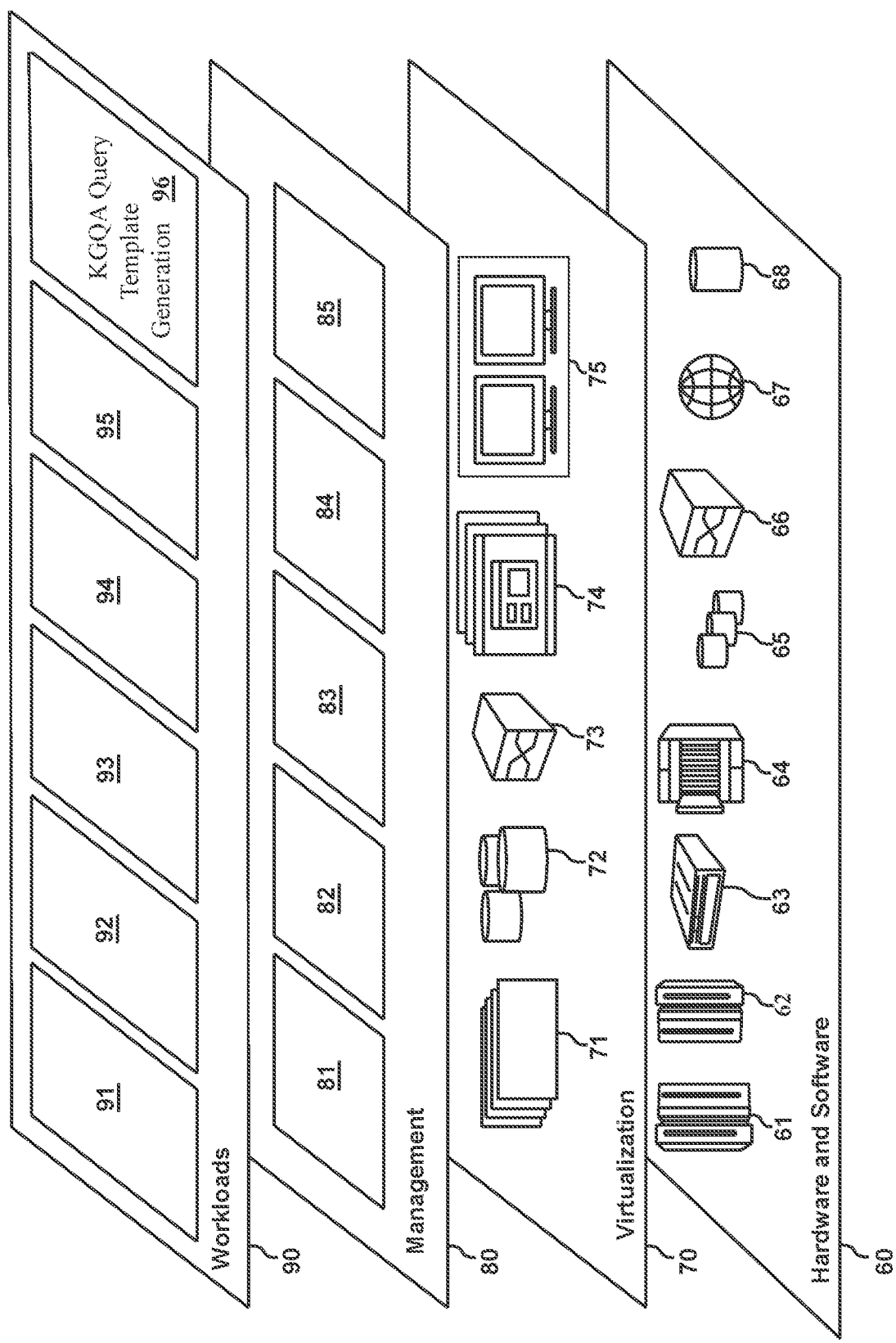
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and KGQA query template generation 96.

With reference now to FIG. 4 to FIG. 8, embodiments of the invention will be described.

As introduced previously in the Background part, knowledge graphs are data structures that define large networks of entities and their semantic relationship. Knowledge graph based QA (KGQA) systems advantageously use knowledge graphs that associate knowledge points with edges using semantic information. KGQA systems can provide improved retrieval efficiency because the structure of a knowledge graph can speed up knowledge indexing.

KGQA systems are commonly built by machine learning. To build a KGQA system, questions and answers are first collected from various sources and labelled as training data. The machine learning involves finding out question types, training a classifier that can classify questions into question types, and developing query templates for the question types. In many current KGQA systems, query templates, as well as other components of the systems are not generated automatically. It can take significant labor and time to develop these tools in a real world KGQA system with a large volume of question types. Embodiments of the invention relate to automatically generating query templates for use in building a KGQA system.

Figure 4:
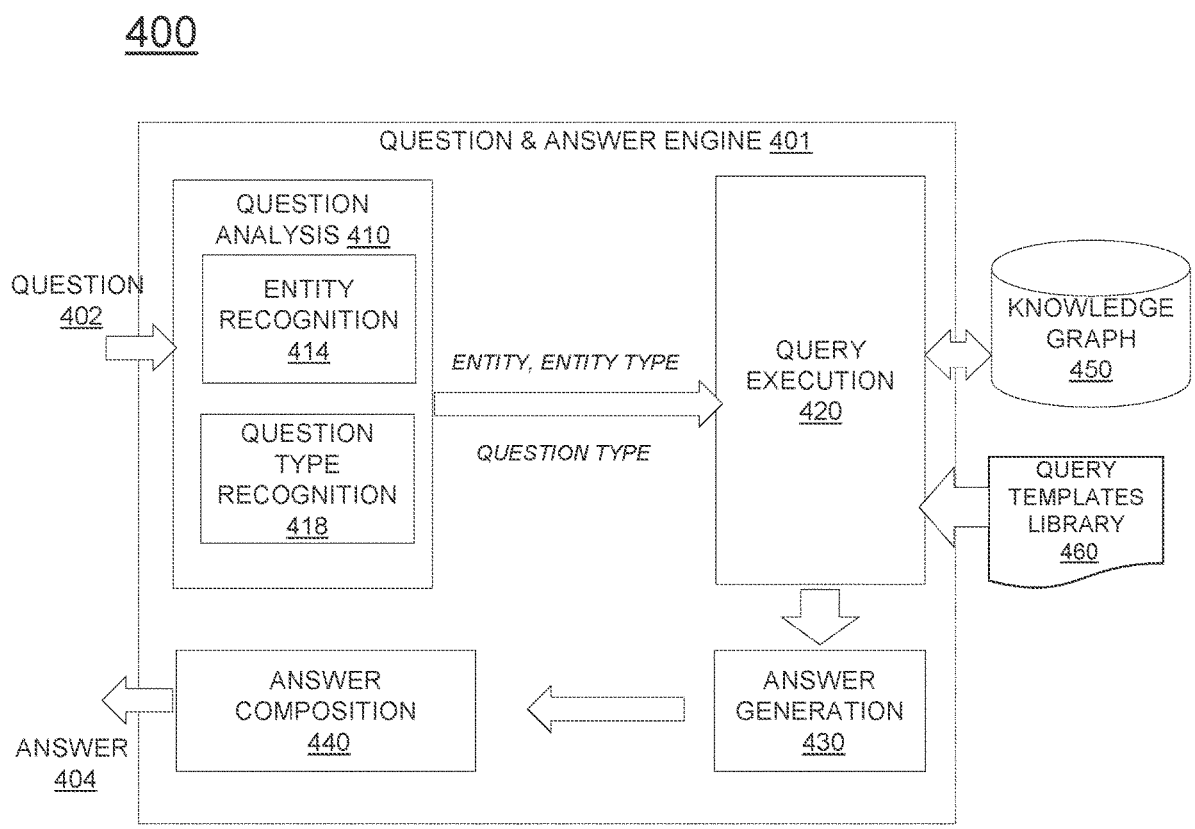
FIG. 4 illustrates the structure and the operation of a KGQA system in which embodiments of the invention may be implemented.

FIG. 4 illustrates the structure and the operation of a KGQA system in which embodiments of the invention may be implemented. As shown, KGQA system 400 comprises a question and answer (QA) engine 401, a knowledge graph 450, and a query templates library 460. Generally, QA engine 401 may receive a question 402 in natural language as input via a user interface (not shown) and outputs an answer 404 in natural language in response to question 402.

More specifically, QA engine 401 may include a question analysis module 410, a query execution module 420, an answer generation module 430, and an answer composition module 440. Question analysis module 410 is configured to parse and analyze question 402. In an embodiment, question analysis module 410 may include an entity recognition module 414 and a question type recognition module 418. Entity recognition module 414 may recognize one or more entities and their types in question 402. Question type recognition module 418 may recognize question type of question 402. Based on the output of entity recognition module 414 and question type recognition module 418, a query template is selected from a query templates library 460, which stores query templates that have already been generated. By populating the one or more entities to the query template, a query may be composed.

As shall be appreciated by one skilled in the art, knowledge graph is a kind of database with the data structure that typically comprises nodes and directed edges. A node represents an entity of a given entity type. An edge between two nodes represents the relationship of two nodes. Cypher is a graph query language suitable for knowledge graph applications. Queries (or query commands, query statements) in Cypher are used to retrieve data from knowledge graphs. In an embodiment, query templates in query templates library 460 are in Cypher query language.

Query execution module 420 executes the query on knowledge graph 450. The result of the execution of the query is fed to answer generation module 430. Answer generation module 430 composes an initial answer using the data output from the execution of the query. Answer generation module 430 feeds the initial answer to answer composition module 440. Answer composition module 440 generates an answer 404 in natural language from the initial answer by using an answer template corresponding to the initial answer.

From the above description, it may be understood that the query executed by execution module 420 is composed by populating entities identified in the question into a query template selected from query templates library 460.

Conventionally, to generate the query templates, raw data (questions and answers) are collected and labelled into training data as input of a machine learning process. Based on the machine learning, a classifier is built, which may classify questions into different question types. During the process, query templates may be built in accordance with known question types and the knowledge graph 450. The number of query templates in query templates library 460 will increase over time as more training data becomes available and more question types are identified.

Building query templates depends on availability of training data and can be time consuming and labor intensive. To accelerate the building of query templates, the present invention proposes an alternate way of automatically generating candidate query templates using knowledge graph schema and filtering the candidate query templates using a raw question-answer corpus, as will be discussed below with reference to FIG. 5 to FIG. 8.

Figure 5:
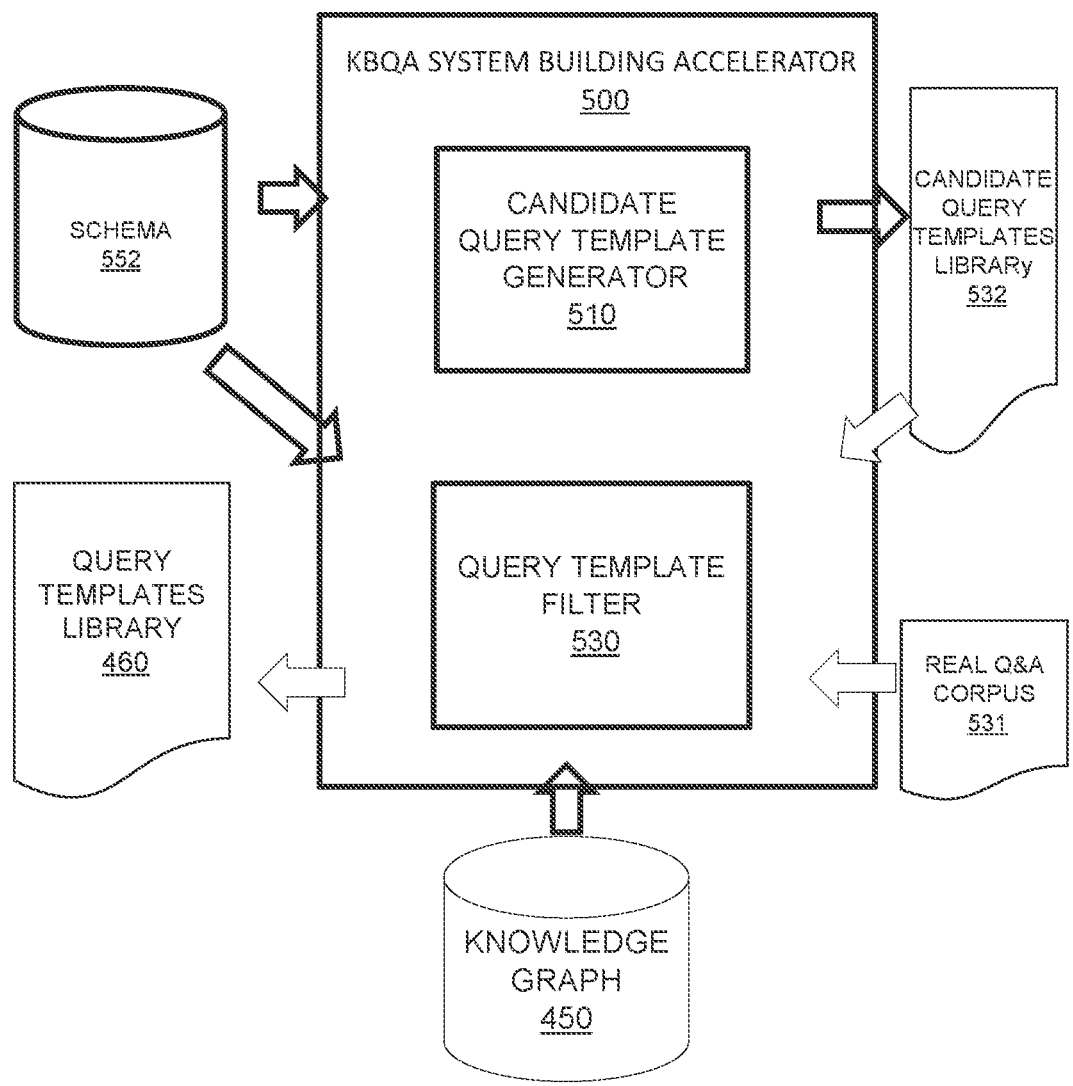
FIG. 5 illustrates components of a KBQA building accelerator, which may be applied to the KBQA system of FIG. 4, according to an embodiment of the invention.

FIG. 5 illustrates a KGQA system building accelerator 500 according to an embodiment of the present invention. As shown, KGQA system building accelerator 500 comprises a candidate query template generator 510 and a Q&A template filter 530. Candidate query template generator 510 is configured to generate a library of candidate query templates 532 based on schema 552 of knowledge graph 450 (FIG. 4). And query template filter 530 is configured to select query templates from candidate query templates 532 by further using real question & answer corpus 531 and knowledge graph 450. The selected query templates will be included into query templates library 460 for KGQA system 400 (FIG. 4).

According to an embodiment of the invention, candidate query template generator 510 is configured to traverse a schema space of knowledge graph 450 with a MATCH statement in Cypher language to generate possible query templates.

FIG. 6 illustrates the generation of candidate query templates by traversing a schema space with a MATCH statement according to an embodiment of the present invention.

As mentioned above, Cypher is a commonly used graph query language that allows users to store and retrieve data from knowledge graph. It may be used to match patterns of nodes and relationships in a knowledge graph. FIG. 6 shows the structure of MATCH statement in Cypher language: MATCH node-pattern WHERE Boolean-expression [WITH columns WHERE Boolean-expression] RETURN columns [ORDER BY] [SKIP] [LIMIT].

As shown, a MATCH statement is basically composed of a MATCH clause, a WHERE clause, and a RETURN clause. The parameter node-pattern in the MATCH clause defines a path in a knowledge graph. The parameter Boolean-expression is a Boolean expression to define a condition relating to elements in node-pattern. And the parameter columns in the RETURN clause define the output of the MATCH statement if the condition of Boolean-expression is satisfied. The output may be one or more nodes in the node-pattern and corresponding attributes.

Other optional clauses of the MATCH statement include "WITH columns WHERE Boolean-expression", "ORDER BY", "SKIP", and "LIMIT", which may be used to filter the output and limit the result space. As the structure is well known in the art, details of the clauses will be omitted here.

FIG. 6 also shows an illustrative subgraph 650 of the schema of knowledge graph 450. For simplicity, subgraph 650 is shown to contain only seven nodes, denoted as 1, 2, 3, 4, 5, 6, and 7. Subgraph 650 is representative of the subgraphs that constitute the schema of knowledge graph 450.

As shown, a schema space 611 corresponding to subgraph 650 may be determined and denoted as {{1}, {2}, {3}, {4}, {5}, {6}, {1,2}, {2,3}, {3,4}, {6,5}, {5,2}, {1,2,3}, {2,3,4}, {6,5,2}, {5,2,3}, {1,2,5}}. For example, {5} is a path containing only node 5, {5,2} is a path containing node 5 and node 2 connected with a directed edge, and so on.

As is known in the art, a knowledge graph schema (referred to as "schema" hereinafter) associated with a knowledge graph defines entity types and their relationship. Here, sub-graph 650 represents a part of a predefined schema 552 (FIG. 5) associated with knowledge graph 450 (FIG. 4 and FIG. 5). For example, in path {5,2}, node 5 represents an entity type "medicine" m and node 2 represents an entity type "disease" d. Their relationship is that medicine m may cure disease d. Here, "m" is an alias of node 5 and "d" is an alias of node 2.

FIG. 7A illustratively shows the definition of node 2 and node 5 and their relationship. As shown, there are a nodes portion and a relation portion. The nodes portion comprises two sections. The first section includes a node_id of "2" and a label of "disease". The node_id "2" is the identifier of node 2 and the label "disease" indicates that node 2 represents an entity type of "disease". The second includes a node_id of "5" and a label of "medicine". The node_id "5" is the identifier of node 5 and the label "medicine" indicates that node 5 represents an entity type of "medicine". The relation portion defines the relationship of node 2 and node 5, namely "manufacture", as indicated by a label included in the relation part.

If node 5 is instantiated with an entity named "aspirin" for example in knowledge graph 450, then "aspirin" is an instance of node 5. If node 2 is instantiated with an entity named "rheumatic fever" for example, then "rheumatic fever" is an instance of node 2. The two instances may define that "the medicine 'aspirin' cures the disease 'rheumatic fever'."

For another example, in path {6,5}, node 6 represents an entity type "producer" (manufacturer) p, and the relationship of node 6 and node 5 is that producer p produces or manufactures medicine m. Here, "p" is an alias of node 6 representing entity type "producer".

FIG. 7B illustratively shows the definition of node 5 and node 6 and their relationship. Again, there are a nodes portion and a relation portion. The nodes portion comprises two sections. The first section includes a node_id of "5" and a label of "medicine". The node_id "5" is the identifier of node 5 and the label "medicine" indicates that node 5 represents an entity type of "medicine". The second section includes a node_id of "6" and a label of "producer". The node_id "6" is the identifier of node 6 and the label "producer" indicates that node 6 represents an entity type of "producer". The relation portion defines the relationship of node 5 and node 6, namely "manufacture", as indicated by a label included in the relation part. Specifically, "medicine is manufactured by producer" or "producer manufactures medicine".

If node 6 is instantiated with a certain entity named "xyz" in KG 450, then "xyz" is an instance of node 6. In the present example, "aspirin" is an instance of node 5, as mentioned above. The two instances may define that 'the producer xyz' manufactures the medicine 'aspirin' or "aspirin is manufactured by xyz".

According to an embodiment of the invention, schema space 611 may be determined by a pre-defined constraint condition in order to limit the size of the space. The constraint condition may comprise either of or all of (1) the maximal length of a path, denoted as "Max-Span"; and (2) the maximal number of incoming edges entering a node, denoted as "Max In-Degree". For example, the constraint condition may be (1) Max-Span=2 and (2) Max In-Degree=2, which means that the maximal length (Max-Span) of any path in the subgraph is 2 and that the maximal number of incoming edges (Max In-Degree) for any node is 2. Here, schema space 611 satisfies the example constraint condition. As shall be appreciated by one skilled in the art, in practice, the constraint condition may be pre-defined in order to limit the size of schema space 611.

According to an embodiment of the invention, schema space 611 constitutes a traverse space for the MATCH clause. After schema space 611 is determined, condition combinations for the WHERE clause may be determined to fill in a condition space 612 for the WHERE clause to traverse and parameter combinations for the RETURN clause may be determined into a result space 613 for traversing. In addition or optionally, parameter combinations for the "WITH columns WHERE Boolean-expression" clause may be determined to form a filter space 614 for traversing, and option combinations for other clauses such as "ORDER BY", "SKIP", and "LIMIT" may be determined to form an option space 615 for traversing.

It is to be noted that, in practice, additional pre-defined constraints may be applied in order to control the size of space 612, 613, 614 and 615. For example, a threshold number of conditions may be set for the space 612 to define the maximal number of conditions for the WHERE clause. As the design and the choice of the constraints are well known to those skilled in the art, detailed description will be omitted here so as to avoid obscuring the focus of the invention.

As shall be appreciated by those skilled in the art, in execution, schema space 611 is traversed first by candidate query template generator 510 (FIG. 5), followed by condition space 612 and result space 613, and, optionally, followed by filter space 614 and option space 615. In this way, the query space corresponding to subgraph 650 may be traversed.

Take three paths or node-patterns discussed in the above, {5}, {5,2} and {6,5}, for example. For each of the node-patterns, a set of query templates may be automatically generated.

A first set of query templates may be generated for node-pattern-{5}, denoted as QT_{5}. QT_{5} may include a query template, qt_{5}_1, as below, for example: MATCH (m:medicine) WHERE m.gen_name contains '{5}' or m.medicine_alias='{5}' RETURN '{5}' as m.name, m.desc, wherein "m" is the alias of node 5, and m.desc is the description of m.name.

A second set of query templates may be generated for node-pattern {6,5}, denoted as QT_{6,5}. QT_{6,5} may include a query template, qt_{6,5}_1, as below, for example: MATCH (p: producer)->(m:medicine)) WHERE m.name='5' RETURN p.name as pn, p.name, wherein "p" is the alias of node 6.

A third set of query templates may be generated for node-pattern {5,2}, denoted as QT_{5,2}. QT_{5,2} may include a query template, qt_{5,2}_1, as below, for example: MATCH ((m:medicine)->(d:disease)) WHERE m.name='5' RETURN d.name as dn, d.name, wherein "d" is the alias of node 2.

The first, the second, and the third set of query templates, QT_{5}, QT_{6,5}, and QT_{5,2} will be included into a set of candidate query templates 532 (FIG. 5).

In a similar way, query templates may be generated for other paths in schema space 611 corresponding to subgraph 650 and may be included into the set of candidate query templates. As a result, query templates may be generated for schema space 611 corresponding to entire subgraph 650.

In a similar way, other query templates may be generated for schema spaces corresponding to other subgraphs (not shown) of the schema of knowledge graph 450. The other query templates generated will be included into the set of candidate query templates 532. In this way, query templates may be generated for entire schema 552 of KG 450 and included into the set of candidate query templates 532. The set of candidate query templates 532 will be used by query template filter 530 (FIG. 5) to select templates for query template library 460 (FIG. 4 and FIG. 5), as is described with reference to FIG. 6.

Thus, the set of candidate query templates is generated automatically. From the above description, it may be understood that, by traversing the entire space of KG schema 552, the set of candidate query templates may comprise all possible query templates. It may be understood that many of the automatically generated candidate query templates might not be realistic. In other words, some candidate query templates might produce answers that will never appear in the real world. Thus, according to embodiments of the invention, after the set of candidate query templates 532 is generated, query template filter 530 (FIG. 5) is operated to filter out those useless query templates or to select useful query templates from candidate query templates 532. The selected query templates will be included into query template library 460 (FIG. 5) for immediate use by the KGQA system without having to wait until they are potentially manually developed.

Figure 8:
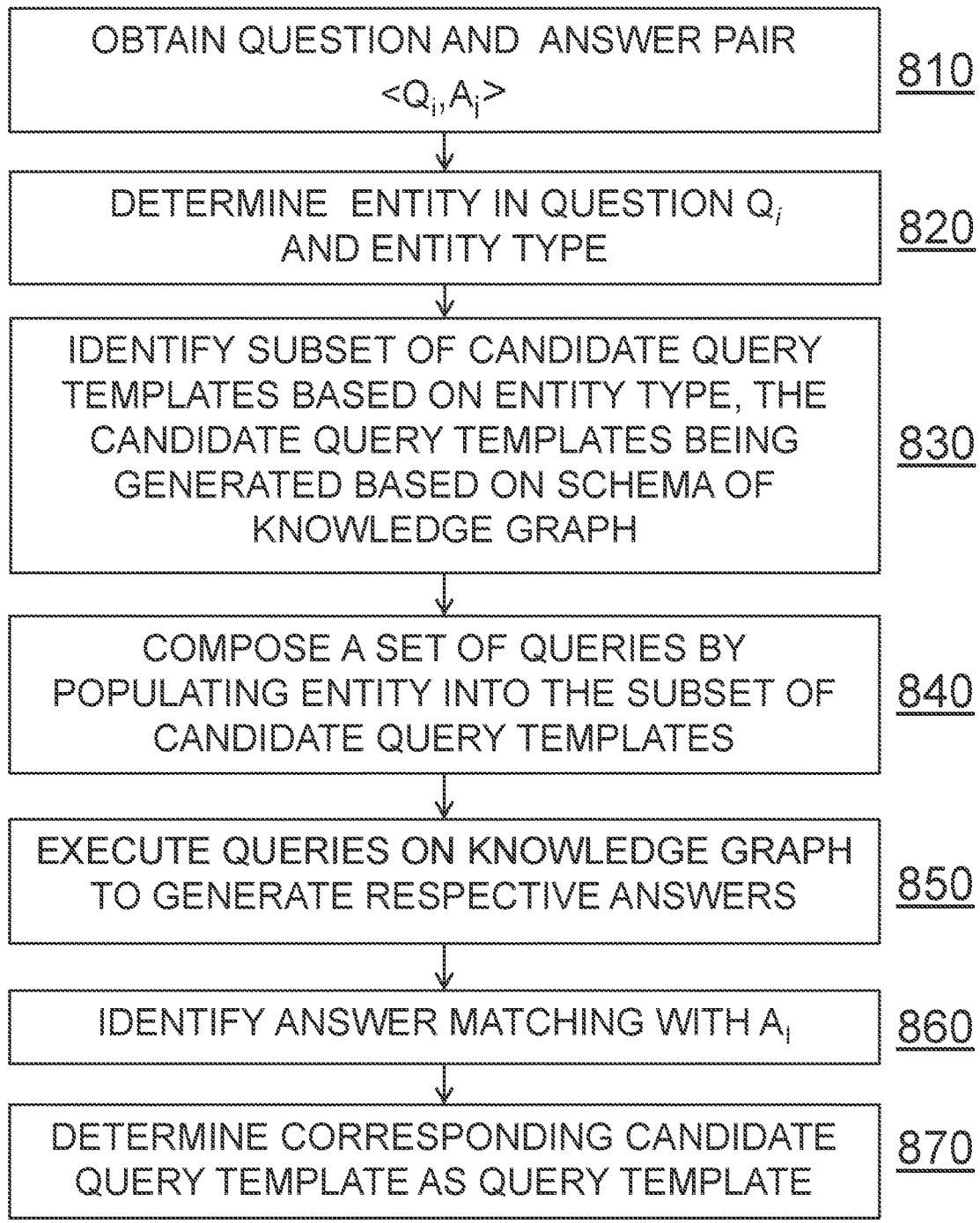
FIG. 8 illustrates a flowchart of a process of filtering candidate query templates to select verified query templates according to an embodiment of the invention.

FIG. 8 illustrates a flowchart of a process 800 of filtering candidate query templates 532 to select verified query templates according to an embodiment of the invention. The function of method 800 may be implemented by query template filter 530 (FIG. 5).

As preparation for process 400, a question and answer (Q&A) corpus 531 (FIG. 5) may be collected and properly organized in advance. Q&A corpus 531 comprises real question-answer pairs in natural language that can be possibly found in the real world. The question-answer pairs may be collected and accumulated from various sources available on the Internet, such as webpages, social networking communities, etc., by employing known data collecting mechanisms, such as data mining and data crawling techniques, of which details will be omitted herein.

Process 800 starts at Step 810, which involves obtaining, by one or more processing units, a pair of question and answer in natural language, the pair of question and answer originating from an online resource. According to an embodiment of the invention, the pair of question and answer may be obtained from Q&A corpus 531 as mentioned above.

For ease of description, in the following description, the pair of question and answer is denoted as <$Q_i, A_i$>, where $Q_i$ and $A_i$ respectively denote the question and the answer of the pair. As an example, assume question $Q_i$ and answer $A_i$ are as below:

$Q_i$: What disease can aspirin cure?
$A_i$: Aspirin can cure rheumatic fever.

Then, Step 820 is performed, by one or more processing units, which involves determining at least one entity in the question and an entity type of each of the at least one entity in consistence with the schema of a knowledge graph.

In the instant case, an entity named "aspirin" may be extracted from question $Q_i$. And entity type of "aspirin" may be determined to be "medicine", which is in consistence with KG schema 552 of knowledge graph 450 (FIG. 4). As previously mentioned in the description with reference to FIG. 5 and FIG. 6, KG schema 552 of knowledge graph 450 defines entity types, such as medicine m, disease d, and factory f In step 420, entity "aspirin" is determined to be of the entity type "medicine" as defined in KG schema 552. In that sense, entity type "medicine" is in consistence with KG schema 552.

Step 820 may be performed by parsing the sentence of question $Q_i$ using known natural language processing (NPL) techniques, such as named entity recognition (NER), of which details will be omitted herein. It is to be noted that, although only one entity is determined in the example, more than one entities may be extracted, depending on the actual question in the question-answer pair.

Having determined the entity type of each of the at least one entity type, Step 830 is performed, by one or more processing units, which involves identifying a subset of candidate query templates based on the entity type of each of the at least one entity, wherein the candidate query templates are generated based on the schema of the knowledge graph.

In the previous paragraphs, descriptions have been provided on the generation of candidate query templates that are included into candidate query templates library 532. The task of Step 830 is to identify some the candidate query templates based on the entity type(s) determined in Step 820.

According to an embodiment of the invention, the subset of candidate query template may be identified if their MATCH clause comprises the entity type of each of the at least one entity. In the instant example, the entity type determined in Step 820 is "medicine", which is in consistence with the entity type represented by node 5 in sub-graph 650 of KG schema 552. As previously described with reference to FIG. 6, the first set of query templates QT_{5}, the second set of query templates QT_{6,5}, and the third set of query templates QT_{5,2} have been automatically generated and included into candidate query templates library 532. Because the Match clauses of all of QT_{5}, QT_{6,5}, and QT_{5,2} comprise entity type "medicine", QT {5}, QT {6,5}, and QT_{5,2} are identified to be the subset of candidate query templates.

Then, Step 840 is performed, by one or more processing units, which involves composing a set of queries by populating the at least one entity into each of the subset of candidate query templates.

As is known in the art, if a query template is populated with relevant entity (entities), it becomes a query (also referred to as query command). The query may be executed by a search engine on KG 450 to generate corresponding query results. For example, an executable query may be composed by populating query template qt_{5,2}_1, namely, MATCH ((m:medicine)->(d.disease)) WHERE m.name='5' RETURN d.name as dn, d.name with "aspirin", which is the entity name of the entity type "medicine". The executable query, denoted as query_{5,2}_1, looks like: MATCH ((m:medicine)->(d.disease)) WHERE m.name='aspirin' RETURN d.name as dn, d.name.

In the instant example, QT_{5}, QT_{6,5}, and QT_{5,2} have been identified to be the subset of candidate query templates. Therefore, a set of queries may be composed by populating each of the candidate query templates in QT_{5}, QT_{6,5}, and QT_{5,2} with "aspirin".

Then, Step 850 is performed, by one or more processing units, which involves executing the set of queries on the knowledge graph to generate respective answers. For example, the set of queries composed by populating each of the candidate query templates in QT_{5}, QT_{6,5}, and QT {5,2} with "aspirin" are executed on KG 450 by query execution module 420 (FIG. 4) one by one. The execution of each of the query will output at least one answer 404 (FIG. 4). For example, execution of query query_{5,2}_1 on KG 450 may output an answer "Aspirin cures rheumatic fever".

Then, Step 860 is performed, by one or more processing units, which involves identifying an answer from the answers that is matching with the answer in the pair of question and answer. This may be done by comparing each of the answers output by execution of each of the set of queries with the actual answer $A_i$ to identify one from the answers that is the same as or most similar to $A_i$. In the instant example, the answer "Aspirin cures rheumatic fever" output by executing query_{5,2}_1 on KG 450 is most similar to $A_i$, which is "Aspirin can cure rheumatic fever".

Then, Step 870 is performed, by one or more processing units, which involves determining a candidate query template, from the subset of candidate query templates, corresponding to the identified answer as a query template. In the instant example, the answer "Aspirin cures rheumatic fever" corresponds to query query_{5,2}_1, which in turn corresponds to candidate query template qt_{5,2}_1. Therefore, query template qt_{5,2}_1, namely, MATCH ((m:medicine)->(d.disease)) WHERE m.name='5' RETURN d.name as dn, d.name, will be determined as a query template.

According to embodiments of the invention, the candidate query template determined as a query template, such as qt_{5,2}_1, will be included into query template library 460 and removed from candidate query template library 532. In practice, query templates library 460 may be checked first to see if there is already the same query template in query template library 460. If yes, there is no need to add the determined candidate query template into query template library 460 so as to avoid redundancy.

According to an embodiment of the invention, before Step 830, the relationship of an entity type with at least one other object in the question Q' may be determined. For example, by parsing $Q_i$, "what disease can aspirin cure", it turns out that the syntax of $Q_i$ is <medicine, cure, what>. So, the relationship of entity type "medicine" with a certain object is that medicine cures the object. This relationship matches with the path {5,2} which defines that "medicine cures disease". Accordingly, in Step 830, identifying a subset of candidate query templates based on the entity type of each of the at least one entity further comprising identifying a subset of candidate query templates based on the relationship of the entity type with the at least one other object in the question Q'. Thus, QT_{5,2} are identified to be the subset of candidate query templates, and QT_{5} and QT_{6,5} may be excluded. In this way, the size of the subset of candidate query templates may be decreased so that the amount of calculation operations may be advantageously decreased.

It is to be noted that the above paragraphs describe the operation of process 400 for only one question-answer pair from Q&A corpus 531. According to embodiments of the invention, process 400 may be iteratively performed for all of the question-answer pairs in Q&A corpus 531. Each iteration may determine a query template from candidate query templates library 532 and add it into query template library 460. In this way, query template library 460 may be expanded automatically, thereby accelerating the building of KGQA system 400 with less human intervention.

It should be noted that the processing of generating query templates according to embodiments of this invention could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method comprising:
   obtaining, by one or more processing units, a pair including a question and an answer in natural language, the pair originating from an online resource;
   determining, by one or more processing units, at least one entity in the question and an entity type of each of the at least one entity in consistence with a schema of a knowledge graph;
   identifying, by one or more processing units, a subset of candidate query templates based on the entity type of each of the at least one entity, wherein the candidate query templates are generated based on the schema of the knowledge graph and traverse a schema space of the schema, wherein the schema space is represented by a graph of nodes representing entity types of entities in the knowledge graph, and wherein the graph is traversed into a sub-graph by a query statement and the sub-graph is constrained by a maximal length of a path;
   composing, by one or more processing units, a set of queries by populating the at least one entity into each of the subset of candidate query templates;
   executing, by one or more processing units, the set of queries on the knowledge graph to generate respective answers;
   identifying, by one or more processing units, a first answer from the respective answers that is matching with the answer in the pair; and determining, by one or more processing units, a candidate query template, from the subset of candidate query templates, corresponding to the first answer as a query template.

2. The computer implemented method of claim 1, wherein the candidate query templates comply with Cypher, and wherein the candidate query templates are generated by using a MATCH clause of a Cypher query statement.

3. The computer implemented method of claim 2, wherein a directed edge linking one node with another node of the nodes represents a relation of the one node with the another node.

4. The computer implemented method of claim 3, wherein using the MATCH clause of Cypher query statement comprises:
using, by one or more processing units, the MATCH clause of Cypher query statement to traverse the sub-graph of the graph, and wherein the sub-graph complies with constraints limiting a size of the sub-graph.

5. The computer implemented method of claim 1, further comprising:
including, by one or more processing units, the candidate query template determined as the query template in a library of query templates.

6. The computer implemented method of claim 1, wherein executing the set of queries on the knowledge graph to generate the respective answers comprises:
composing, by one or more processing units, the respective answers in natural language based on data retrieved from the knowledge graph in response to execution of the set of queries on the knowledge graph.

7. The computer implemented method of claim 1, further comprising:
determining, by one or more processing units, a relationship of an entity type with at least one other object in the question, and
wherein identifying the subset of candidate query templates based on the entity type of each of the at least one entity further comprises:
identifying, by one or more processing units, a subset of candidate query templates based on the relationship of the entity type with the at least one other object in the question.

8. A system, comprising:
a processor; and
a memory containing a program that, when executed on the processor, performs an operation, the operation comprising:
obtaining a pair including a question and an answer in natural language, the pair originating from an online resource;
determining, by one or more processing units, at least one entity in the question and an entity type of each of the at least one entity in consistence with a schema of a knowledge graph;
identifying a subset of candidate query templates based on the entity type of each of the at least one entity, wherein the candidate query templates are generated based on the schema of the knowledge graph and traverse a schema space of the schema, wherein the schema space is represented by a graph of nodes representing entity types of entities in the knowledge graph, and wherein the graph is traversed into a sub-graph by a query statement and the sub-graph is constrained by a maximal length of a path;
composing a set of queries by populating the at least one entity into each of the subset of candidate query templates;
executing the set of queries on the knowledge graph to generate respective answers;
identifying a first answer from the respective answers that is matching with the answer in the pair; and
determining a candidate query template, from the subset of candidate query templates, corresponding to the first answer as a query template.

9. The system of claim 8, wherein the candidate query templates comply with Cypher, and wherein the candidate query templates are generated by using MATCH clause of Cypher query statement.

10. The system of claim 9, wherein a directed edge linking one node with another node of the nodes represents a relation of the one node with the another node.

11. The system of claim 10, wherein using the MATCH clause of Cypher query statement comprises using the a MATCH clause of a Cypher query statement to traverse the sub-graph of the graph, and wherein the sub-graph complies with constraints limiting a size of the sub-graph.

12. The system of claim 8, further comprising:
including the candidate query template determined as the query template in a library of query templates.

13. The system of claim 8, wherein executing the set of queries on the knowledge graph to generate the respective answers comprises:
composing the respective answers in natural language based on data retrieved from the knowledge graph in response to execution of the set of queries on the knowledge graph.

14. The system of claim 8, further comprising:
determining a relationship of an entity type with at least one other object in the question, and wherein identifying the subset of candidate query templates based on the entity type of each of the at least one entity further comprising:
identifying a subset of candidate query templates based on the relationship of the entity type with the at least one other object in the question.

15. A computer program product comprising:
a computer-readable storage medium having computer-readable program code embodied therewith, the computer-readable program code executable by one or more computer processors to perform an operation, the operation comprising:
obtaining a pair including a question and an answer in natural language, the pair originating from an online resource;
determining, by one or more processing units, at least one entity in the question and an entity type of each of the at least one entity in consistence with a schema of a knowledge graph;
identifying a subset of candidate query templates based on the entity type of each of the at least one entity, wherein the candidate query templates are generated based on the schema of the knowledge graph and traverse a schema space of the schema, wherein the schema space is represented by a graph of nodes representing entity types of entities in the knowledge graph, and wherein the graph is traversed into a sub-graph by a query statement and the sub-graph is constrained by a maximal length of a path;
composing a set of queries by populating the at least one entity into each of the subset of candidate query templates;

executing the set of queries on the knowledge graph to generate respective answers;

identifying a first answer from the respective answers that is matching with the answer in the pair; and determining a candidate query template, from the sub-set of candidate query templates, corresponding to the first answer as a query template.

16. The computer program product of claim 15, wherein the candidate query templates comply with Cypher, and wherein the candidate query templates are generated by using a MATCH clause of a Cypher query statement.

17. The computer program product of claim 16, wherein a directed edge linking one node with another node of the nodes represents a relation of the one node with the another node.

18. The computer program product of claim 17, wherein using the MATCH clause of Cypher query statement comprises using the MATCH clause of Cypher query statement to traverse the sub-graph of the graph, and wherein the sub-graph complies with constraints limiting a size of the sub-graph.

19. The computer program product of claim 15, further comprising:

including the candidate query template determined as the query template in a library of query templates.

20. The computer program product of claim 15, wherein executing the set of queries on the knowledge graph to generate respective answers comprises:

composing the respective answers in natural language based on data retrieved from the knowledge graph in response to execution of the set of queries on the knowledge graph.

* * * * *